United States Patent
Bagge-Hansen et al.

(10) Patent No.: US 10,086,431 B2
(45) Date of Patent: Oct. 2, 2018

(54) POROUS MATERIALS VIA FREEZE-CASTING OF METAL SALT SOLUTIONS

(71) Applicants: LAWRENCE LIVERMORE NATIONAL SECURITY, LLC, Livermore, CA (US); NATIONAL TECHNOLOGY & ENGINEERING SOLUTIONS OF SANDIA, LLC, Albuquerque, NM (US)

(72) Inventors: Michael Bagge-Hansen, San Leandro, CA (US); Patrick G. Campbell, Oakland, CA (US); Jeffrey D. Colvin, Pleasanton, CA (US); Sergei Kucheyev, Oakland, CA (US); Thomas E. Felter, Livermore, CA (US)

(73) Assignees: Lawrence Livermoe National Security, LLC, Livermore, CA (US); National Technology & Engineering Solutions of Sandia, LLC, Albuquerque, NM (US)

( * ) Notice: Subject to any disclaimer, the term of this patent is extended or adjusted under 35 U.S.C. 154(b) by 394 days.

(21) Appl. No.: 14/741,334

(22) Filed: Jun. 16, 2015

(65) Prior Publication Data
US 2016/0368047 A1    Dec. 22, 2016

(51) Int. Cl.
*B22F 1/00*     (2006.01)
*B82Y 40/00*     (2011.01)
(Continued)

(52) U.S. Cl.
CPC .......... *B22F 1/0018* (2013.01); *B22F 1/0022* (2013.01); *B22F 9/026* (2013.01);
(Continued)

(58) Field of Classification Search
CPC ................. B22F 1/0018; B22F 1/0022; B22F 2009/0824; B22F 2009/0832;
(Continued)

(56) References Cited

U.S. PATENT DOCUMENTS

| | | | |
|---|---|---|---|
| 6,862,890 B2 * | 3/2005 | Williams et al. | 62/64 |
| 2013/0220077 A1 * | 8/2013 | Barsa | 75/599 |

FOREIGN PATENT DOCUMENTS

WO    WO 2013139384 A1 *    9/2013

OTHER PUBLICATIONS

Bellows et al., Freeze-Drying of Aqueous-Solutions—Maximum Allowable Operating Temperature. Cryobiology, 1972, vol. 9, No. 6, pp. 559-561.

(Continued)

*Primary Examiner* — Colleen P Dunn
*Assistant Examiner* — Anthony M Liang
(74) *Attorney, Agent, or Firm* — Foley & Lardner, LLP

(57) ABSTRACT

Disclosed here is a method for making a nanoporous material, comprising aerosolizing a solution comprising at least one metal salt and at least one solvent to obtain an aerosol, freezing the aerosol to obtain a frozen aerosol, and drying the frozen aerosol to obtain a nanoporous metal compound material. Further, the nanoporous metal compound material can be reduced to obtain a nanoporous metal material.

18 Claims, 5 Drawing Sheets

(51) Int. Cl.
*C01G 3/02* (2006.01)
*B22F 9/02* (2006.01)
*B22F 9/08* (2006.01)

(52) U.S. Cl.
CPC ............... *B22F 9/082* (2013.01); *C01G 3/02* (2013.01); *B22F 2009/084* (2013.01); *B22F 2009/0824* (2013.01); *B22F 2009/0832* (2013.01); *B22F 2009/0844* (2013.01); *B22F 2009/0864* (2013.01); *B22F 2201/013* (2013.01); *B22F 2201/20* (2013.01); *B22F 2202/03* (2013.01); *B22F 2301/10* (2013.01); *B22F 2301/255* (2013.01); *B22F 2304/05* (2013.01); *B22F 2304/10* (2013.01); *B82Y 40/00* (2013.01)

(58) Field of Classification Search
CPC ........ B22F 2009/084; B22F 2009/0844; B22F 2009/0864; B22F 2201/013; B22F 2201/20; B22F 2202/03; B22F 2301/10; B22F 2301/255; B22F 2304/05; B22F 2304/10; B22F 9/026; B22F 9/082; B82Y 40/00; C01G 3/02
See application file for complete search history.

(56) References Cited

OTHER PUBLICATIONS

Devadasu et al., "Can Controversial Nanotechnology Promise Drug Delivery?" Chemical Reviews 2013, vol. 113, No. 3, pp. 1686-1735.
Franks et al., Freeze-Drying for Pharmaceuticals and Biopharmaceuticals. The Royal Society of Chemistry 2007.
Li et al., "Electroreduction of Carbon Monoxide to Liquid Fuel on Oxide-Derived Nanocrystalline Copper" Nature 2014, vol. 508, pp. 504-520.
O'Donnell et al., "Atmospheric Freeze Drying for the Reduction of Powder Electrostatics of Amorphous, Low Density, High Surface Area Pharmaceutical Powders", Drug Development and Industrial Pharmacy 2013, vol. 39, No. 2, pp. 205-217.
Qian et al., "Controlled Freezing and Freeze Drying: A Versatile Route for Porous and Micro/Nano-Structured Materials", Journal of Chemical Technology and Biotechnology 2011, vol. 86, No. 2, pp. 172-184.
Rogers et al., "A Novel Particle Engineering Technology to Enhance Dissolution of Poorly Water Soluble Drugs: Spray-Freezing into Liquid" European Journal of Pharmaceutics and Biopharmaceutics 2002, vol. 54, No. 3, pp. 271-280.
Tappan et al., "Nanoporous Metal Forms", Reviews:Angewandte Chemie, 2010, vol. 49, pp. 4544-4565.

* cited by examiner

POROUS MATERIALS VIA FREEZE-CASTING OF METAL SALT SOLUTIONS

STATEMENT OF GOVERNMENT SUPPORT

This invention was made with government support under Contract No. DE-AC52-07NA27344 awarded by the U.S. Department of Energy and under Grant No. BRCALL08-PR3-C-2-0006 awarded by the Defense Threat Reduction Agency (DTRA) of the U.S. Department of Defense. The government has certain rights in this invention.

BACKGROUND

Nanoporous materials (e.g., polymers, metals, inorganic compounds) are three-dimensional structures that resemble foam. The interconnected ligaments and struts (typically less than 1000 nm in diameter) form complex networks that provide porosity of often more than 50%. This nano-architecture offers high specific surface areas and ultralow density in some cases. While nanoporous compounds such as silica and alumina are mass-produced, nanoporous metals have conventionally required much more complex synthesis strategies (e.g., templated assembly, dealloying, sol-gel approaches, nanosmelting, super-critical drying, or combustion synthesis), making broad deployment economically unfeasible. Nonetheless, nanoporous metal foams are compelling materials as they can maintain good electrical and thermal conductivity while offering size-effect-enhanced activity, tunable density and specific surface area, and novel electro/mechanical behavior (Tappan et al., *Angew. Chem. Int. Ed.*, 2010, 49:4544-4565). Consequently, nanoporous metals are being sought for applications such as catalysis, battery and capacitor electrodes, heat sinks, hydrogen storage, filtration, antimicrobial scaffolds, high-energy density physics experiments, and inks for additive manufacturing of printed batteries and sensors.

Thus, a need exists for improved methods for producing nanoporous metal and metal compound materials.

SUMMARY

Disclosed here is an innovative process for producing nanoporous metal and metal compound materials based on freeze-drying of aerosolized and optionally pressurized solutions, and subsequent thermal processing. Compared to conventional approaches, the process described herein offers high yield, high purity, and uniformity. The process can generate both porous micro-particles and macroscopic monoliths with down to nanometer scale ligaments/struts. The density of the nanoporous material can be controlled by adjusting the concentration of metal salts in the starting solution and/or by the compaction of the freeze-dried porous material.

One aspect of the invention described herein relates to a method for making a nanoporous material, comprising: aerosolizing a solution comprising at least one metal salt and at least one solvent to obtain an aerosol; freezing the aerosol to obtain a frozen aerosol; and drying the frozen aerosol to obtain a nanoporous metal compound material.

In some embodiments, the method further comprises reducing the nanoporous metal compound material to a nanoporous metal material. In some embodiments, the nanoporous metal material comprises at least about 40 wt. % of elemental metal.

In some embodiments, the method further comprises assembling the nanoporous metal compound material into a macroscopic monolith. In some embodiments, the method further comprises assembling the nanoporous metal material into a macroscopic monolith.

In some embodiments, the solution comprises a silver salt and/or a copper salt. In some embodiments, the solution comprises at least two metal salts. In some embodiments, the solution comprises water as the solvent.

In some embodiments, the solution is aerosolized by a nebulizer, a nozzle, a syringe, and/or a sprayer. In some embodiments, the aerosol has an average or mean droplet diameter of about 100 microns or less.

In some embodiments, the aerosol is frozen by contacting with liquid nitrogen, a cryogen, a cold surface, and/or a cold gas. In some embodiments, the frozen aerosol is dried in a vacuum chamber. In some embodiments, the frozen aerosol is dried at a temperature of about −90° C. to about 25° C.

In some embodiments, the nanoporous metal compound material is decomposed and/or reduced by thermal and/or gas treatment. In some embodiments, the nanoporous metal compound material is decomposed/reduced thermally at a temperature of about 700° C. or less. In some embodiments, the nanoporous metal compound material is reduced by light.

Another aspect of the invention relates to a nanoporous metal compound material obtained by the method described herein, comprising nanoporous metal compound particles or foams having an average or mean diameter of about 100 microns or less.

In some embodiments, the nanoporous metal compound material comprises nanoporous metal compound particles or foams which comprise a network of interconnected ligaments and struts having an average or mean diameter of about 1000 nm or less.

Another aspect of the invention relates to a nanoporous metal material obtained by the method described herein, comprising nanoporous metal particles or foams having an average or mean diameter of about 100 microns or less.

In some embodiments, the nanoporous metal material comprises nanoporous metal particles or foams which comprise a network of interconnected ligaments and struts having an average or mean diameter of about 1000 nm or less.

These and other features, together with the organization and manner of operation thereof, will become apparent from the following detailed description when taken in conjunction with the accompanying drawings.

DETAILED DESCRIPTION

Figure 1:
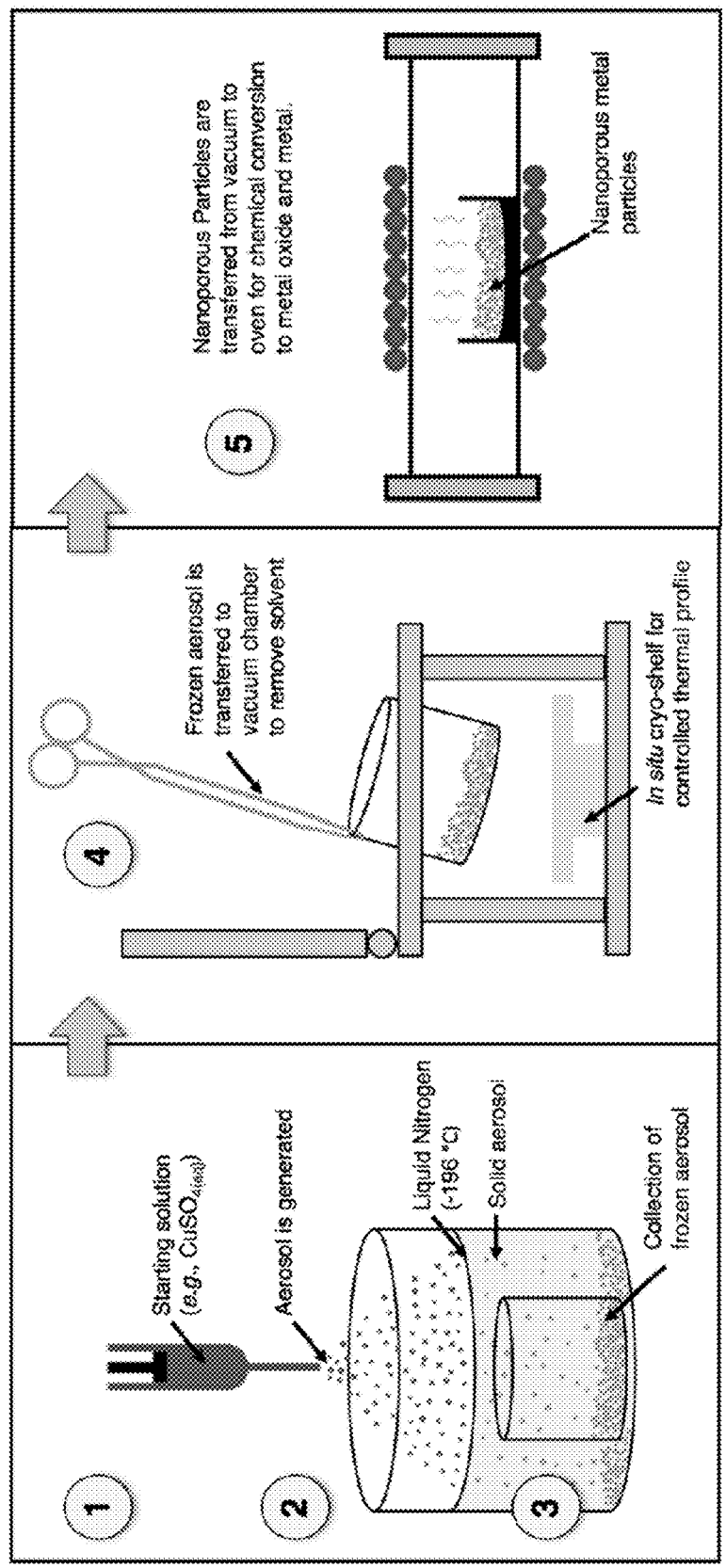
FIG. 1: Schematic of an example process for making nanoporous materials. The process yields nanoporous particles with high uniformity and porosity.

Reference will now be made in detail to some specific embodiments of the invention contemplated by the inventors for carrying out the invention. Certain examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

Many embodiments of the invention described herein relate to a method for making a nanoporous material, comprising aerosolizing a solution comprising at least one metal salt and at least one solvent to obtain an aerosol, freezing the aerosol to obtain a frozen aerosol, and drying the frozen aerosol to obtain a nanoporous metal compound material.

In certain embodiments, the method comprises the following steps: (1) formulating an amenable solution (which is typically a metal salt in aqueous solution but can be any liquid solution with a metal containing solute) that is liquid at the conditions prior to solidification and is in a solid phase in the cryogen of choice; (2) aerosolizing/atomizing/spraying the solution by, for example, flow the liquid through a nozzle, with a nebulizer, by disruption of a liquid jet, or combinations of the above; (3) freezing the aerosol typically by contact with a cryogen such as liquid nitrogen or a cold surface; (4) collecting, filtering, and vacuum desiccating the frozen aerosol, optionally using an in-situ temperature controlled-shelf; (5) optionally, assembly of the aerosol particles into macroscopic parts; and (6) optionally, converting the product to a desired state, typically with controlled-environment thermal processing (e.g., reduction of silver acetate to silver, or reduction of copper sulfate to copper and/or copper oxide) or through surface reaction chemistry with a fluid or vapor that achieves or catalyzes the same.

Formulation of Metal Salt Solution

In some embodiments, the solution comprises salt(s) of at least one metal selected from Cu, Ag, Au, Fe, Co, Ni, Pd, Pt, Ti, Al, Mg, Li, Pb, Zn, Cr, Mo, W, Ru, Rh, Os, Sm, and Mn. In some embodiments, the solution comprises at least one copper salt. The copper salt can be, for example, $CuSO_4$, $Cu(NO_3)_2$, $Cu(OAc)_2$. In some embodiments, the solution comprises at least one silver salt. The silver salt can be, for example, $AgC_2H_3O_2$, AgCl, or $AgNO_3$.

In some embodiments, the solution comprises a metal salt that can be directly reduced to a corresponding elemental metal. In some embodiments, the solution comprises a metal salt that can be converted to a corresponding metal oxide.

In some embodiments, the solution comprises at least two different metal salts. The two metal salts can comprise the same metal or two different metals. When two different metal salts are involved, the process described herein can produce nanoporous alloys and multiphase products. In some embodiments, the solution comprises at least one copper salt and at least one non-copper salt. In some embodiments, the solution comprises at least one silver salt and at least one non-silver salt.

In some embodiments, the solution is an unsaturated solution of at least one metal salt. In some embodiments, the solution is a saturated solution of at least one metal salt. In some embodiments, the solution is a super-saturated solution of at least one metal salt. In some embodiments, the concentration of the metal salt in the solution is about 50%, or about 60%, or about 65%, or about 70%, or about 75%, or about 80%, or about 85%, or about 90%, or about 95% of a saturated solution. In some embodiments, the solution comprises at least one copper salt, and the concentration of the copper salt is about 0.5 M. In some embodiments, the solution comprises at least one silver salt, and the concentration of the silver salt is about 0.05 M.

A suitable solution should be able to be frozen in available cryogens such as liquid nitrogen. Also, the selected metal salt should have reasonable solubility in the solvent chosen.

In some embodiments, the solution comprises water as the solvent. In some embodiments, the solution comprises at least one organic solvent, such as alcohol, ketones, glycols, kerosene and other aliphatic solvents and carbon tetrachloride and other halogenated solvents. In some embodiments, the solution comprises at least one inorganic solvent, such as liquid anhydrous ammonia and other solvents with appropriate polarity, freezing, and evaporation/volatility characteristics. In some embodiments, the solution comprises at least two solvents that are miscible with each other.

In some embodiments, the solution further comprises at least one additive for modifying the assembly of salt crystal structures. The additive can be, for example, surfactants, pH modifiers, and surface binding species to alter crystal growth kinetics, such as copper citrate.

Generating the Aerosol

Substantially uniform particle size distributions (e.g., log-normal) can be obtained using freeze-dried aerosols because the particle dimensions are established during the vapor phase. Mechanical techniques (e.g., milling, grinding, micronization) cannot readily reach the nanoscale and cannot readily produce uniform shapes.

Accordingly, in some embodiments, the method described herein comprises aerosolizing a metal solution by a nebulizer, a nozzle, a syringe, and/or a sprayer.

In some embodiments, the aerosol has an average or mean droplet diameter of about 200 microns or less, or about 100 microns or less, or about 50 microns or less, or about 20 microns or less, or about 10 microns or less.

In some embodiments, the aerosol is generated outside a cryogen bath and sprayed onto the cryogen bath, optionally placed next to a nebulizer, a nozzle, a syringe, and/or a sprayer. In some embodiments, the aerosol is generated by a nebulizer, a nozzle, a syringe, and/or a sprayer immersed in a cryogen bath.

In some embodiments, an ultrasonic nebulizer (e.g., Sonaer 241 PGT) coupled with a gas-driven nozzle are used to generate the aerosol. The size of the aerosol droplets, the nozzle position and rate of aerosol flow can be precisely controlled.

In some embodiments, an electronic high-pressure syringe (e.g, Teledyne 100 DX) is used to generate the aerosol. This high-pressure syringe can be used in conjunction with an aerosolizing nozzle with exquisite control. The high-pressure syringe also provides an option to immerse the output nozzle into liquid nitrogen, wherein the injected solution under high pressure (>5000 psi) would provide a continuous liquid jet that turbulently interacts with the cryogen before freezing. During this turbulent stage, small particles can be formed. This approach does not require equilibrium starting solutions and is compatible with both super saturated solutions and suspensions.

In some embodiments, an ultrasonic nozzle (e.g., Sonotek 180 kHz Nozzle) is used to create reproducible and controlled aerosols of metal salt solutions. The mean droplet size of the aerosol can be selected by adjusting the ultrasonic frequency. Additionally, nitrogen gas can be used to increase the velocity of the resulting spray and shape the resulting spray, which can alter the freezing profile and mitigate droplet interaction.

Freezing the Aerosol

In the freezing stage, the solvent undergoes a liquid-solid phase transition, and the metal salt experiences super-saturation, precipitation, and segregation. By controlling the aerosol size as discussed in the foregoing section, radial size-effects can be achieved.

In some embodiments, the aerosol is frozen by contacting a cryogen. In some embodiments, the aerosol is frozen by contacting liquid nitrogen. In some embodiments, the aerosol is frozen in a cryogen bath. In some embodiments, the aerosol is frozen on a cold surface. In some embodiments, the aerosol is frozen by contacting a cold gas.

Vacuum Desiccation

The frozen product can be collected and optionally filtered, and transferred to a suitable vacuum chamber for drying by sublimation of the solvent (e.g., water).

In some embodiments, the frozen aerosol is dried in a vacuum chamber. In some embodiments, the frozen aerosol is dried on an in-situ cryo shelf or a temperature controlled shelf. In some embodiments, the frozen aerosol is dried at a temperature of about −90° C. to about 0° C., e.g., when water is the solvent. In some embodiments, the frozen aerosol is dried at a temperature of about −90° C. to about 25° C. or about −50° C. to about −5° C. The drying temperatures are preferably scaled to the characteristics of the chosen solvents and salts.

In some embodiments, the method involves microwave-assisted drying, which may reduce drying times and vacuum requirements.

In some embodiments, the method comprises substantially or totally removing the solvent and the cryogen from the frozen aerosol. In some embodiments, the solvent and the cryogen are substantially or totally removed from the frozen aerosol by sublimation.

In some embodiments, the freeze-dried nanoporous metal compound material is a nanoporous assembly of the starting metal salt(s).

In some embodiments, the freeze-dried nanoporous metal compound material has a porosity of at least about 30%, or at least about 40%, or at least about 50%, or at least about 60%, or at least about 70%, or at least about 80%. In some embodiments, the freeze-dried nanoporous metal compound material has a density of about 1000 mg/cc or less, or about 100 mg/cc or less, or about 10 mg/cc or less.

In some embodiments, the freeze-dried nanoporous metal compound material comprises nanoporous particles or foams having an average or mean diameter of about 200 microns or less, or about 100 microns or less, or about 50 microns or less, or about 20 microns or less, or about 10 microns or less, or about 5 microns or less.

In some embodiments, the freeze-dried nanoporous metal compound material comprises nanoporous particles or foams which comprise a network of interconnected ligaments and struts having an average or mean diameter of about 1000 nm or less, or about 500 nm or less, or about 200 nm or less, or about 100 nm or less, or about 50 nm or less, or about 20 nm or less, or about 10 nm or less.

In some embodiments, the freeze-dried nanoporous metal compound material comprises substantially homogeneous nanoporous particles or foams. In some embodiments, at least 30%, or at least 50%, or at least 70%, or at least 90% of the nanoporous metal compound particles have diameters that are within about 50-150% of the average or mean diameter of all nanoporous particles in the composition. In some embodiments, at least 30%, or at least 50%, or at least 70%, or at least 90% of the nanoporous metal compound particles have diameters that are within about 70-130% of the average or mean diameter of all nanoporous particles in the composition. In some embodiments, at least 30%, or at least 50%, or at least 70%, or at least 90% of the nanoporous metal compound particles have diameters that are within about 80-120% of the average or mean diameter of all nanoporous particles in the composition.

In some embodiments, at least 30%, or at least 50%, or at least 70%, or at least 90% of the nanoporous metal compound particles have diameters that are within about 1-5 microns. In some embodiments, at least 30%, or at least 50%, or at least 70%, or at least 90% of the nanoporous metal compound particles have diameters that are within about 5-10 microns. In some embodiments, at least 30%, or at least 50%, or at least 70%, or at least 90% of the nanoporous metal compound particles have diameters that are within about 10-20 microns. In some embodiments, at least 30%, or at least 50%, or at least 70%, or at least 90% of the nanoporous metal compound particles have diameters that are within about 20-30 microns. In some embodiments, at least 30%, or at least 50%, or at least 70%, or at least 90% of the nanoporous metal compound particles have diameters that are within about 30-50 microns.

Post-Freeze-Drying Processing

The freeze-drying process described in the foregoing sections typically produce nanoporous foams of the starting solute. For example, $CuSO_4$ foams can be produced from $CuSO_4(aq)$, and $AgC_2H_3O_2$ foams can be produced from $AgC_2H_3O_2(aq)$. Such salt foams can be thermally or otherwise decomposed to elemental metal and/or metal oxide, while maintaining the nanoporous architecture.

Accordingly, in some embodiments, the method further comprises reducing the nanoporous metal compound material to a nanoporous metal or metal oxide material. In some embodiments, porosity and density of the nanoporous metal compound material are preserved when being decomposed/reduced to the nanoporous metal or metal oxide material.

In some embodiments, the nanoporous metal compound material is decomposed and/or reduced by thermal or gas treatment. In some embodiments, the nanoporous metal compound material is decomposed and/or reduced thermally at a temperature of 800° C. or less, or 700° C. or less, or 600° C. or less, or 500° C. or less, or 400° C. or less, or 350° C. or less, or 300° C. or less, or 250° C. or less, or 200° C. or less. The decomposing or reducing environment can comprise, for example, at least one or more of the following gasses: $N_2$, Ar, CO, $H_2$, $NH_3$, $CH_4$, and $H_2S$.

In some embodiments, the method comprises reducing copper oxide (which is converted from a copper salt such as copper sulfate) to copper using at least one or CO, $H_2$, $NH_3$, $CH_4$, and $H_2S$. Copper sulfate can be reduced to copper metal in a two-step process via an oxide intermediate.

In some embodiments, the method comprises reducing silver acetate to silver by thermal treatment. Silver acetate can be thermally decomposed to form metallic silver at about 210° C. This operation can be done without severe densification of the product.

In some embodiments, the nanoporous metal compound material is reduced by light, which could mitigate heat-induced coarsening. In one embodiment, the method comprises reducing silver acetate to silver by light.

In some embodiments, the nanoporous metal material obtained comprises at least about 40 wt. %, or at least about 50 wt. %, or at least about 60 wt. %, or at least about 70 wt. %, or at least about 80 wt. %, or at least about 90 wt. %, or at least about 95 wt. %, or at least about 99 wt. % of elemental metal. In some embodiments, the nanoporous metal material obtained consists essentially of or consists of elemental metal.

In some embodiments, the nanoporous metal material obtained has a porosity of at least about 30%, or at least about 40%, or at least about 50%, or at least about 60%, or at least about 70%, or at least about 80%. In some embodiments, the nanoporous metal material obtained has a density of about 1000 mg/cc or less, or about 100 mg/cc or less, or about 10 mg/cc or less.

In some embodiments, the nanoporous metal material comprises nanoporous particles or foams having an average or mean diameter of about 200 microns or less, or about 100 microns or less, or about 50 microns or less, or about 20 microns or less, or about 10 microns or less, or about 5 microns or less.

In some embodiments, the nanoporous metal material comprises nanoporous particles or foams which comprises a network of interconnected ligaments and struts having an average or mean diameter of about 1000 nm or less, about 500 nm or less, or about 200 nm or less, or about 100 nm or less, or about 50 nm or less, or about 20 nm or less, or about 10 nm or less.

In some embodiments, the nanoporous metal material comprises substantially homogeneous nanoporous particles or foams. In some embodiments, at least 30%, or at least 50%, or at least 70%, or at least 90% of the nanoporous metal particles have diameters that are within about 50-150% of the average or mean diameter of all nanoporous metal particles in the composition. In some embodiments, at least 30%, or at least 50%, or at least 70%, or at least 90% of the nanoporous metal particles have diameters that are within about 70-130% of the average or mean diameter of all nanoporous metal particles in the composition. In some embodiments, at least 30%, or at least 50%, or at least 70%, or at least 90% of the nanoporous metal particles have diameters that are within about 80-120% of the average or mean diameter of all nanoporous metal particles in the composition.

Monolith Fabrication

The as-formed particles can be used to produce monolithic, macro-scale structures of arbitrary dimensions, which can further be machined into appropriate geometries for a given application. The monoliths can be fabricated in arbitrary shapes by spray-casting into forms/molds, which are removed after the freeze-drying and reduction steps.

Further, electrophoretic deposition (EPD) can be used to fabricate graded density monolith structures. Suspensions of particles with different densities can be used sequentially to build up layers. In addition, complex geometries can be obtained through powder metallurgical strategies including rapid sintering/annealing.

In some embodiments, the method described herein comprises assembling the nanoporous metal compound material obtained by freezing drying of the aerosol into a macroscopic monolith. In some embodiments, the method described herein comprises assembling the nanoporous metal material obtained by reduction into a macroscopic monolith.

Applications

The nanoporous materials described herein have various applications. For example, the nanoporous material can serve as catalysts, as electrodes in energy storage devices (e.g., batteries, capacitors), as hydrogen storage materials, as X-ray sources, as components of advanced inks for additive manufacturing (e.g., 3D printing), in heat sinks, in filtration desalinization, as a desiccant, as antimicrobial/antibacterial materials, as bio-scaffolds, and in drug delivery.

WORKING EXAMPLES

Example 1—Copper-Containing Nanoporous Material

A. Experimental Procedures for Making Nanoporous Copper from Copper Sulfate.

Deionized water was mixed with solid copper sulfate ($CuSO_4$) to prepare a room temperature 0.5 M aqueous solution. A carefully cleaned syringe pump equipped with a 25 mL glass syringe body was filled with the solution. The solution was then injected at 8 ml/min into a conical tipped ultrasonic nozzle (Sono-tek) operating at 180 kHz, 3 W. The nozzle tip was then immediately positioned approximately 10 cm above a cylindrical glass dewar filled with liquid nitrogen. Immersed within the liquid nitrogen, approximately 10 cm below the surface, was a Pyrex, 250 mL beaker nested within a stainless steel beaker of the same size (hereafter, the beaker). Approximately 100 mL of solution (4×25 mL) was aerosolized into the liquid nitrogen. Subsequently, the beaker was removed from the liquid nitrogen. Approximately half of the liquid nitrogen within the beaker was poured back into the dewar. The beaker and the remaining content of the beaker (a portion of the frozen aerosol and liquid nitrogen) were placed within a vacuum vessel (base pressure ~30 mTorr). Rapid pumping reduced the internal pressure and induced the liquid nitrogen to change phase into solid nitrogen ice. The nitrogen ice sublimed over several minutes. Next, the frozen water sublimed. The product was left to dry in vacuum for approximately 48 hours, after which the system pressure was stable near the base pressure (~30 mTorr) and the pressure rise upon closing off the pump was consistent with baseline testing, pre-sample. A white-blue powder was observed within the beaker. The beaker was removed from vacuum, preferably without ambient exposure (e.g., under dry nitrogen), and the contents were transferred into a quartz crucible. The crucible was placed within a sealed tube furnace held at 600° C. for 4 hour, under flowing nitrogen, to decompose the $CuSO_4$ to CuO. The product, black in color, remained in the furnace at 250° C. for 2 hours, under flowing hydrogen. The furnace was cooled rapidly. The resulting product is nanoporous copper.

Figure 2:
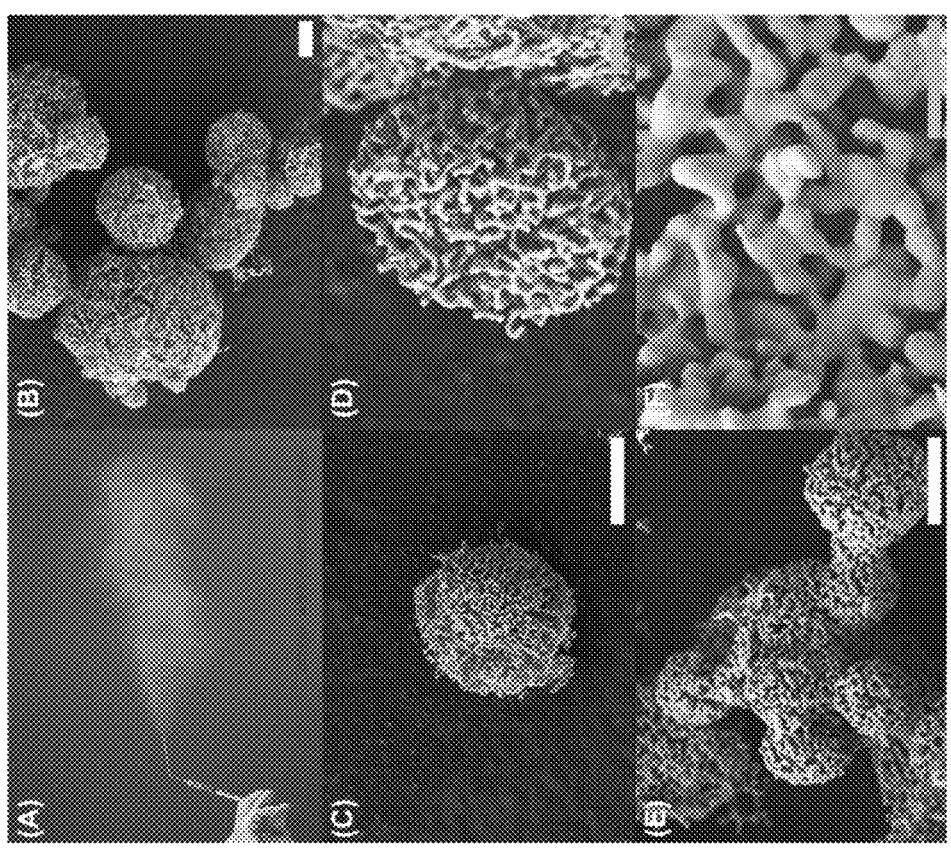
FIG. 2: (A) Aerosolized solutions provide an effective route to generating nearly spherical particles. (B-D) Nanoporous $CuSO_4$ particles produced by freeze-drying. (E-F) Nanoporous $Cu/Cu_2O$ produced by thermal processing of (B), which can be further reduced to pure Cu. Scale bars are 5 μm (B, C, E) and 1 μm (D, F).
Figure 3:
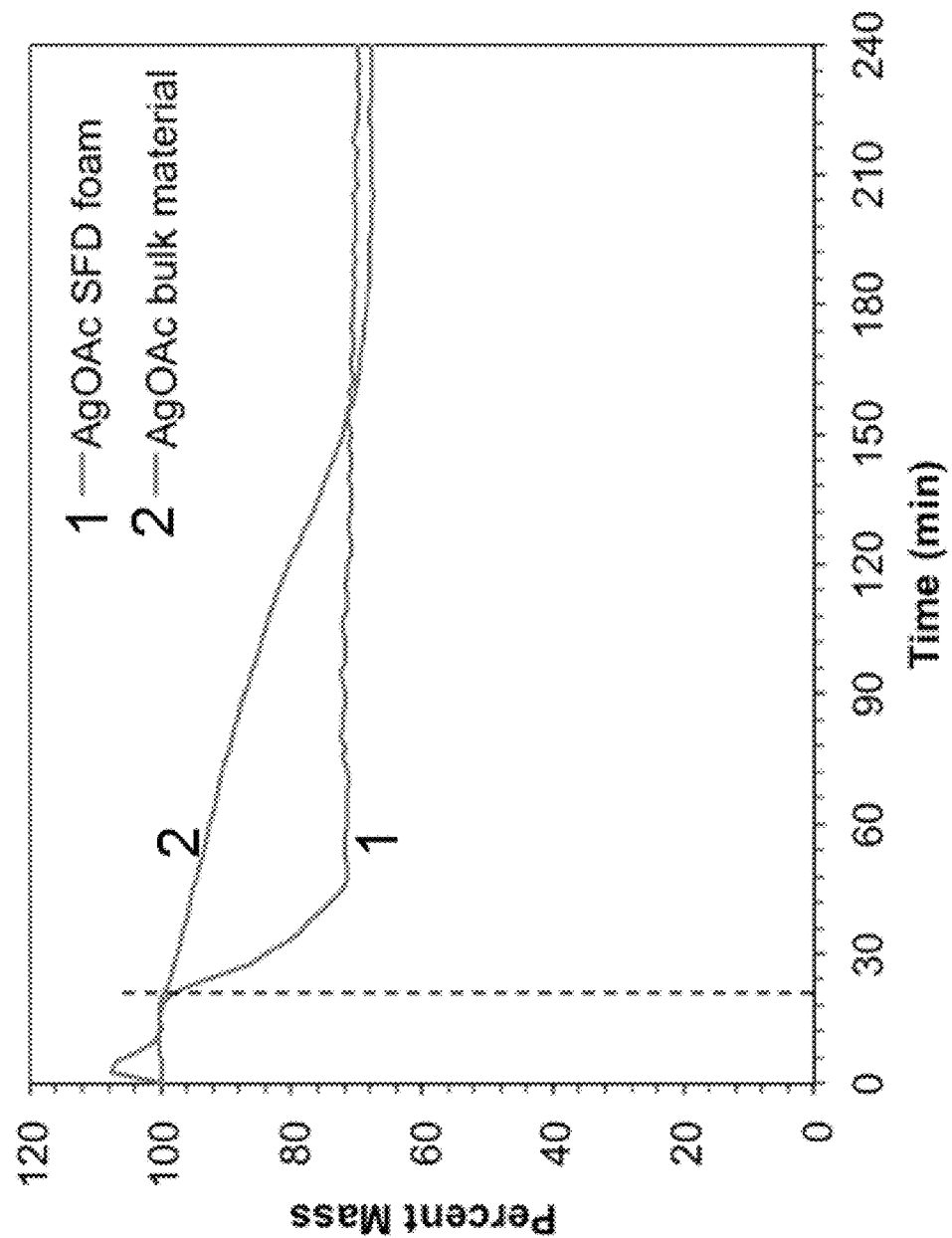
FIG. 3: Thermogravimetric analysis for the conversion of silver acetate (AgOAc) to Ag metal. Kinetics for SFD (spray freeze-drying) product (ca. 30 min) are much faster than for a bulk sample of AgOAc (ca. 120 min). Dashed line indicates point at which 210° C. is reached. Conditions: 10 K/min ramp rate from r.t. to 210° C., hold at 210° C., Ar flow 40 mL/min.
Figure 4:
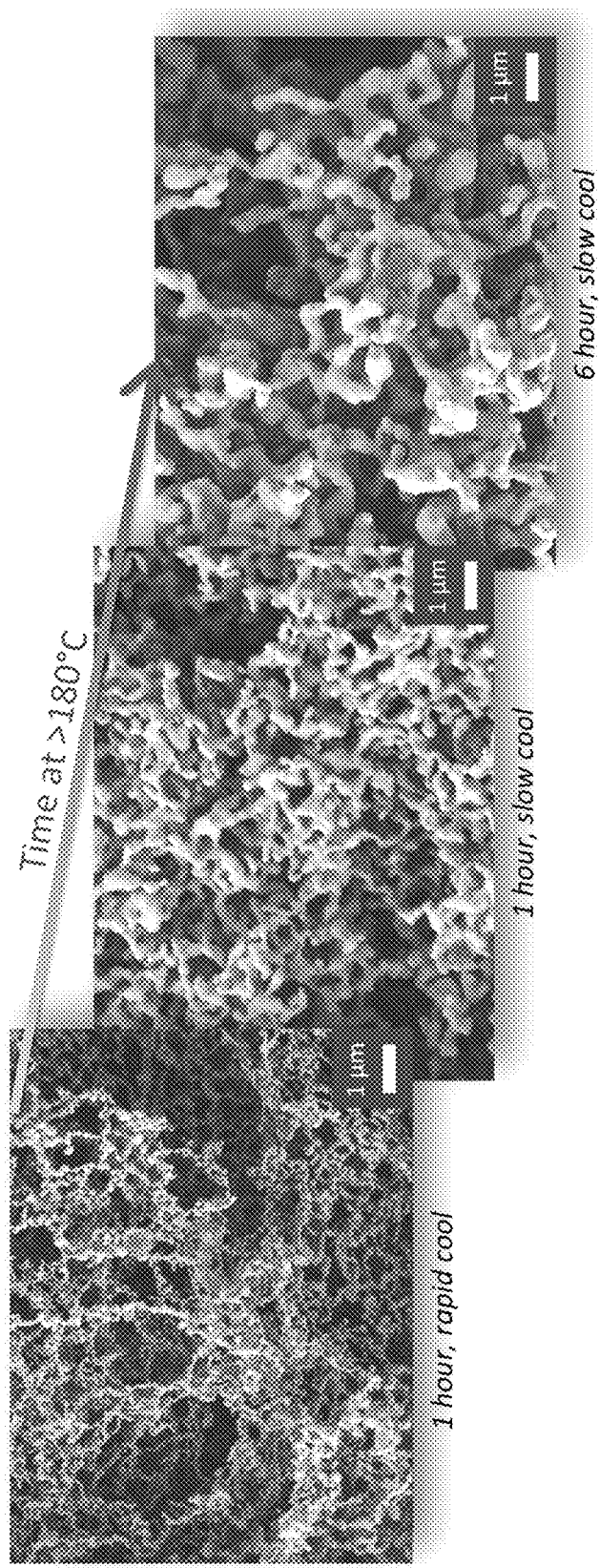
FIG. 4: SEM (scanning electron microscope) images of time/temperature induced coarsening of Ag Foams produced by the SFD process. Conditions: 210° C. with varying dwell and cool-down times, $N_2$ flow 40 mL/min.
Figure 5:
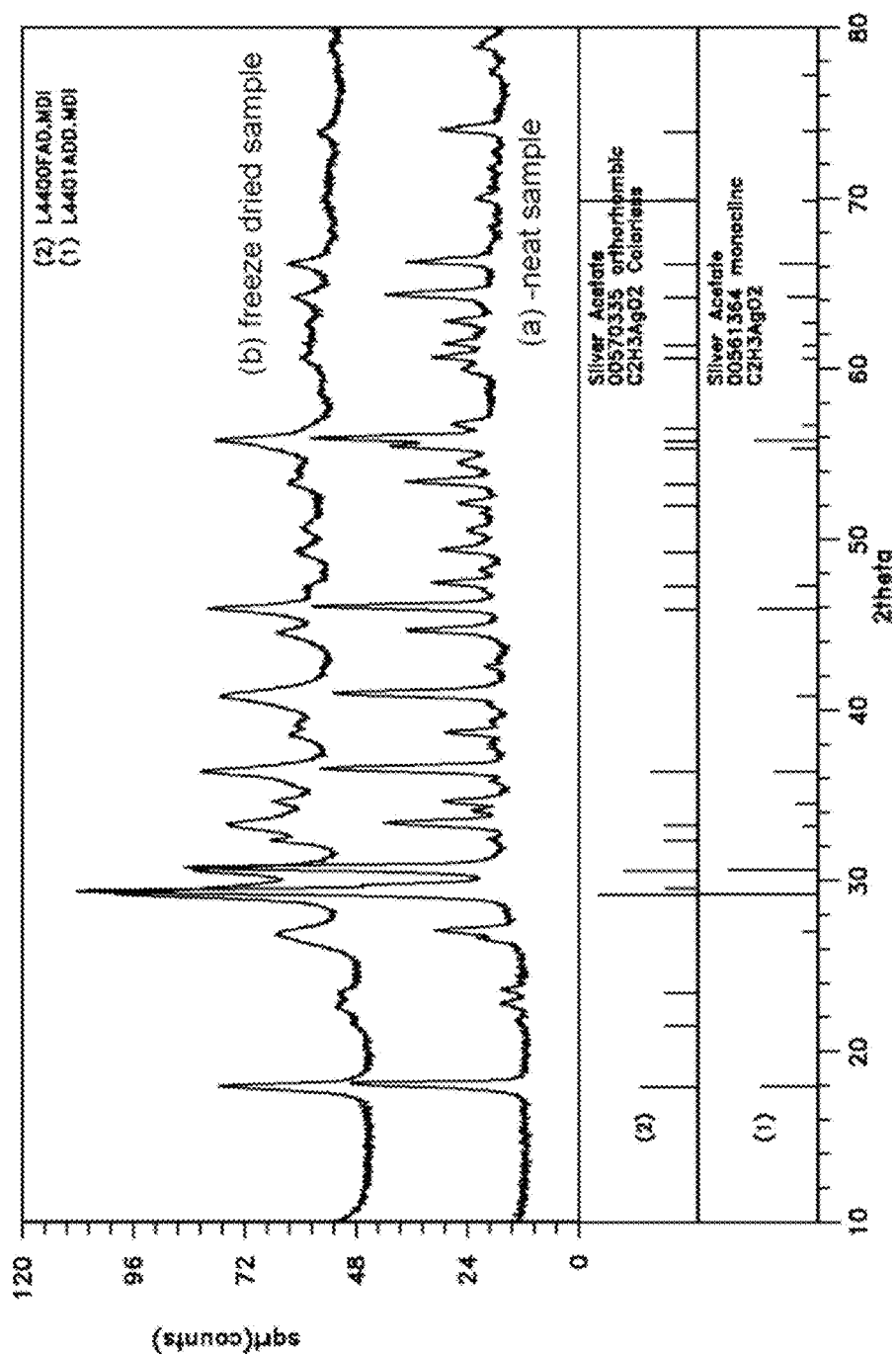
FIG. 5: X-ray diffraction spectra for (a) SFD-produced AgOAc and (b) bulk AgOAc reference. The curves are plotted with square root on the y-axis to bring out the low intensity peaks. The majority of the peaks observed match those of silver acetate from the structure database. Peak widths for the reference sample (b) are sharper than for the SFD sample suggesting that the reference sample is more ordered or that the domain size in the SFD sample is smaller.

B. Materials Characterization—As shown in FIG. 2, freeze-drying of the aerosolized $CuSO_4$ solution successfully produced nanoporous $CuSO_4$ particles (FIG. 2B-2D). The subsequent thermal processing reduced the nanoporous $CuSO_4$ particles to $Cu/Cu_2O$ foams (FIG. 2E-2F).

Example 2—Silver-Containing Nanoporous Material

A. Experimental Procedures for Making Nanoporous Silver from Silver Acetate.

Deionized water was mixed with solid silver acetate (AgOAc) to prepare a room temperature 0.05 M aqueous solution. A carefully cleaned syringe pump equipped with a 25 mL glass syringe body was filled with the solution. The solution was then injected at 8 ml/min into a conical tipped ultrasonic nozzle (Sono-tek) operating at 180 kHz, 3 W. The nozzle tip was then immediately positioned approximately 10 cm above a cylindrical glass dewar filled with liquid nitrogen. Immersed within the liquid nitrogen, approximately 10 cm below the surface, was a Pyrex, 250 mL beaker nested within a stainless steel beaker of the same size (hereafter, the beaker). Approximately 100 mL of solution (4×25 mL) was aerosolized into the liquid nitrogen. Subsequently, the beaker was removed from the liquid nitrogen. Approximately half of the liquid nitrogen within the beaker was poured back into the dewar. The beaker and the remaining content of the beaker (a portion of the frozen aerosol and liquid nitrogen) were placed within a vacuum vessel (base pressure ~30 mTorr). Rapid pumping reduced the internal pressure and induced the liquid nitrogen to change phase into solid nitrogen ice. The nitrogen ice sublimed over several minutes. Next, the frozen water sublimed. The product was left to dry in vacuum for approximately 48 hours, after which the system pressure was stable near the base pressure (~30 mTorr) and the pressure rise upon closing off the pump was consistent with baseline testing, presample. A white powder was observed within the beaker. The beaker was removed from vacuum and the contents transferred into a quartz crucible. The crucible was placed within a sealed tube furnace held at 210° C. for 1 hour, under flowing nitrogen. The furnace was cooled rapidly. The resulting product is nanoporous silver.

B. Materials Characterization

As shown in FIG. 3, thermogravimetric analysis (TGA) was used to characterize the kinetics of thermal reduction of AgOAc to Ag metal. It was found that the SFD foams were reduced to metal much faster than a fully dense bulk material sample. The enhanced kinetics can be attributed to reduction in free energy associated with coarsening of nanostructured ligaments.

As shown in FIG. 4, scanning electron microscopy (SEM) was used to visually characterize the morphology of the metal-salt foams and reduced metal foams. Systematic studies were undertaken to understand the effects of reduction conditions (time/temperature) on the resulting foam morphology. For example, density and ligament size can be controlled in Ag metal foams by varying the dwell time (e.g., increasing the annealing time from 1 to 6 hours at 210° C. as shown in FIG. 2) and cooling conditions in the reduction process.

As shown in FIG. 5, X-Ray diffraction (XRD) was used to determine the crystallinity of the SFD produced AgOAc material. The peaks detected confirm that the material is microcrystalline and not amorphous. The peaks are much broader for the SFD-produced material than for a reference sample of bulk AgOAc, which suggests that the SFD-produced material is less ordered.

As used herein, the singular terms "a," "an," and "the" include plural referents unless the context clearly dictates otherwise. Thus, for example, reference to a compound can include multiple compounds unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations, which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scopes of this invention.

What is claimed is:

1. A method for making a nanoporous metal material, comprising:

aerosolizing a solution comprising at least one metal salt and at least one solvent to obtain an aerosol;

freezing the aerosol to obtain a frozen aerosol;

drying the frozen aerosol to obtain a nanoporous metal compound material; and converting the nanoporous metal compound material to a nanoporous metal material, wherein the nanoporous metal material comprises at least about 40 wt. % of elemental metal.

2. The method of claim 1, further comprising assembling the nanoporous metal material into a macroscopic monolith.

3. The method of claim 1, wherein the solution comprising a silver salt and/or a copper salt.

4. The method of claim 1, wherein the solution comprising at least two metal salts.

5. The method of claim 1, wherein the solution comprising water as the solvent.

6. The method of claim 1, wherein the solution is aerosolized by a nebulizer, a nozzle, a syringe, and/or a sprayer.

7. The method of claim 1, wherein the aerosol has an average or mean droplet diameter of 100 microns or less.

8. The method of claim 1, wherein the aerosol is frozen by contact with liquid nitrogen.

9. The method of claim 1, wherein the frozen aerosol is dried in a vacuum chamber.

10. The method of claim 1, wherein the frozen aerosol is dried at a temperature of about −90° C. to about 25° C.

11. The method of claim 1, wherein the nanoporous metal compound material is reduced by thermal or gas treatment.

12. The method of claim 1, wherein the nanoporous metal compound material is reduced thermally at a temperature of about 600° C. or less.

13. The method of claim 1, wherein the nanoporous metal compound material is reduced by light.

14. The method of claim 1, wherein the nanoporous metal material obtained comprises at least about 80 wt. % of elemental metal.

15. The method of claim 1, wherein the nanoporous metal material obtained has a porosity of at least about 30%.

16. The method of claim 1, wherein the nanoporous metal material obtained has a porosity of at least about 50%.

17. The method of claim 1, wherein the nanoporous metal material obtained has a density of about 1000 mg/cc or less.

18. The method of claim 1, wherein the nanoporous metal material obtained has a density of about 100 mg/cc or less.

* * * * *